United States Patent
Minemoto et al.

(10) Patent No.: US 12,248,310 B2
(45) Date of Patent: *Mar. 11, 2025

(54) DISPLAY SYSTEM, DISPLAY METHOD, AND NON-TRANSITORY COMPUTER-READABLE RECORDING MEDIUM RECORDING DISPLAY PROGRAM

(71) Applicant: OMRON Corporation, Kyoto (JP)

(72) Inventors: Toshifumi Minemoto, Kyoto (JP); Reiko Hattori, Kyoto (JP); Yuya Ota, Kyoto (JP); Shinsuke Kawanoue, Kyoto (JP); Akira Nakajima, Otsu (JP)

(73) Assignee: OMRON Corporation, Kyoto (JP)

( * ) Notice: Subject to any disclaimer, the term of this patent is extended or adjusted under 35 U.S.C. 154(b) by 965 days.

This patent is subject to a terminal disclaimer.

(21) Appl. No.: 17/270,445

(22) PCT Filed: Feb. 3, 2020

(86) PCT No.: PCT/JP2020/003868
§ 371 (c)(1),
(2) Date: Feb. 23, 2021

(87) PCT Pub. No.: WO2020/183973
PCT Pub. Date: Sep. 17, 2020

(65) Prior Publication Data
US 2021/0191380 A1 Jun. 24, 2021

(30) Foreign Application Priority Data
Mar. 13, 2019 (JP) .................................. 2019-045644

(51) Int. Cl.
*G06F 3/0482* (2013.01)
*G05B 23/02* (2006.01)

(52) U.S. Cl.
CPC ..... *G05B 23/0272* (2013.01); *G05B 23/0278* (2013.01); *G06F 3/0482* (2013.01); *G05B 2219/14098* (2013.01)

(58) Field of Classification Search
CPC ...... G05B 23/0272; G05B 2219/14097; G05B 23/0278; G05B 2219/14098; G06F 3/0482
See application file for complete search history.

(56) References Cited

U.S. PATENT DOCUMENTS 6,421,571 B1 * 7/2002 Spriggs .................. G05B 19/19
700/83
2002/0138184 A1 * 9/2002 Kipersztok ........ G05B 23/0278
701/32.9

(Continued)

FOREIGN PATENT DOCUMENTS

| CN | 1930540 | 3/2007 |
| CN | 107924173 | 4/2018 |

(Continued)

OTHER PUBLICATIONS

"International Search Report (Form PCT/ISA/210)" of PCT/JP2020/003868, mailed on Mar. 24, 2020, with English translation thereof, pp. 1-6.

(Continued)

*Primary Examiner* — Tuyetlien T Tran
*Assistant Examiner* — Jianmei F Duckworth
(74) *Attorney, Agent, or Firm* — JCIPRNET

(57) ABSTRACT

A display system includes a display device in production equipment. The display device includes a control unit, a display unit, a storage unit, and an input unit. The storage unit stores: schematic illustration data that represent a schematic illustration of the production equipment; and causal relationship model data in which one or more cause elements of one or more abnormalities that can occur in the (Continued)

production equipment are selected from driving means for driving the production equipment and monitoring means for monitoring the production, and the cause elements and the relationships between the cause elements are represented as a causal relationship model. The control unit displays the schematic illustration and the causal relationship model on the display unit such that the causal relationship model is superimposed on the schematic illustration so as to correspond to the schematic illustration.

5 Claims, 10 Drawing Sheets

(56) References Cited

U.S. PATENT DOCUMENTS

| | | | |
|---|---|---|---|
| 2007/0052973 | A1 | 3/2007 | Yamaguchi |
| 2014/0236418 | A1 | 8/2014 | Koga et al. |
| 2015/0185718 | A1* | 7/2015 | Tappan ................ G06F 3/0481 700/83 |
| 2016/0326726 | A1 | 11/2016 | Koga |
| 2020/0005563 | A1* | 1/2020 | Zaccherini ............. G07C 5/008 |
| 2020/0041988 | A1* | 2/2020 | Natsumeda ........ G05B 23/0221 |
| 2020/0265329 | A1* | 8/2020 | Thomsen ............... G06N 20/10 |

FOREIGN PATENT DOCUMENTS

| | | |
|---|---|---|
| CN | 108334890 | 7/2018 |
| CN | 108733010 | 11/2018 |
| JP | H05147625 | 6/1993 |
| JP | H08202444 | 8/1996 |
| JP | H11188584 | 7/1999 |
| JP | H11242503 | 9/1999 |
| JP | 2003167624 | 6/2003 |
| JP | WO2002035302 | 3/2004 |
| JP | 2005008060 | 1/2005 |
| JP | 2007065934 | 3/2007 |
| JP | 2007140918 | 6/2007 |
| JP | 2009157517 | 7/2009 |
| JP | 2010277199 | 12/2010 |
| JP | 2015172945 | 10/2015 |
| JP | 2018116545 | 7/2018 |
| JP | 2018173332 | 11/2018 |
| JP | 2018181021 | 11/2018 |
| JP | 6480625 | 3/2019 |
| WO | 2013047408 | 4/2013 |

OTHER PUBLICATIONS

"Written Opinion of the International Searching Authority (Form PCT/ISA/237)" of PCT/JP2020/003868, mailed on Mar. 24, 2020, with English translation thereof, pp. 1-8.
"Search Report of Europe Counterpart Application", issued on Oct. 24, 2022, p. 1-p. 8.
Office Action of Japan Counterpart Application, with English translation thereof, issued on Oct. 25, 2021, pp. 1-6.
"Office Action of China Counterpart Application", issued on Nov. 9, 2023, with English translation thereof, p. 1-p. 21.
"Office Action of Japan Counterpart Application" with English translation thereof, issued on Jun. 7, 2022, p. 1-p. 6.

* cited by examiner

DISPLAY SYSTEM, DISPLAY METHOD, AND NON-TRANSITORY COMPUTER-READABLE RECORDING MEDIUM RECORDING DISPLAY PROGRAM

CROSS-REFERENCE TO RELATED APPLICATION

This application is a 371 application of the International PCT application serial no. PCT/JP2020/003868, filed on Feb. 3, 2020, which claims the priority benefits of Japan Patent Application No. 2019-045644, filed on Mar. 13, 2019. The entirety of each of the above-mentioned patent applications is hereby incorporated by reference herein and made a part of this specification.

TECHNICAL FIELD

The present invention relates to a display system, a display method, and a non-transitory computer-readable recording medium recording a display program.

DESCRIPTION OF RELATED ART

As a method of monitoring an equipment state, Patent Document 1 proposes a method of performing mode division for each operating state on the basis of an event signal, creating a normal model for each mode, and determining an abnormality on the basis of the created normal model. In this method, by checking the sufficiency of training data used for creation of the normal model, and setting a threshold value to be used for the determination of an abnormality depending on a result of the checking, a false notification in which normality is incorrectly determined as an abnormality is prevented from occurring.

Further, Patent Document 2 proposes a method of detecting an abnormality occurring in a product produced by production equipment. Specifically, Patent Document 2 proposes a method of classifying data collected from a production system into a case in which the product is normal and a case in which the product is abnormal, specifying a feature quantity having a significant difference between the case in which the product is normal and the case in which the product is abnormal, and diagnosing whether or not the product is normal on the basis of the specified feature quantity.

RELATED ART

Patent Document

Patent Document 1

Japanese Patent Laid-Open No. 2015-172945

Patent Document 2

Japanese Patent Laid-Open No. 2010-277199

SUMMARY

Technical Problem

Incidentally, when an abnormality occurs in production equipment, the abnormality must be resolved immediately, but it is common for a user to investigate a cause of the occurring abnormality using a manual or the like and then perform a process for addressing the abnormality. However, when the manual is checked each time an abnormality occurs, it takes time and may delay processing. The present invention has been made to solve this problem, and the present invention provides a display system, a display method, and a display program capable of easily confirming causes of an abnormality that can occur in production equipment.

Solution to the Problem

A display system according to the present invention is a display system provided in production equipment that produces a product and includes one or more driving means configured to perform driving of the production equipment and one or more monitoring means configured to perform monitoring of the production, the display system including: a control unit, a display unit, a storage unit, and an input unit, wherein the storage unit stores schematic illustration data representing a schematic illustration of the production equipment, and causal relationship model data in which one or more cause elements of one or more abnormalities that can occur in the production equipment are selected from among the driving means and the monitoring means and represented as a causal relationship model together with a relationship between the cause elements, and the control unit is configured to display the schematic illustration and the causal relationship model on the display unit so that the causal relationship model is superimposed on the schematic illustration so as to correspond to the schematic illustration.

With this configuration, the schematic illustration of the production equipment and the causal relationship model related to the abnormality that may occur in the production equipment are displayed on the display unit. In this case, since the causal relationship model is superimposed and displayed on the display unit to correspond to the schematic illustration, the cause element included in the causal relationship model can be specified while the schematic illustration is viewed. Therefore, it is possible to easily visually recognize where the abnormality is occurring in the production equipment.

In the display system, the storage unit can store causal relationship model data related to a plurality of abnormalities, and an input unit is configured to receive a selection of one abnormality from the plurality of abnormalities, and the control unit is configured to display the causal relationship model corresponding to the selected abnormality on the display unit.

With this configuration, since the causal relationship model data related to the plurality of abnormalities is stored, a user can select, for example, an actually occurring abnormality from the plurality of abnormalities using the input unit. Therefore, it is possible to easily confirm the causal relationship model for each abnormality that has occurred.

In the display system, the driving means and the monitoring means can have one or more controllable feature quantities, and the control unit can display the cause element of each abnormality and the one or more feature quantities corresponding to the cause element as a list on the display unit.

With this configuration, since the cause element and the feature quantity corresponding thereto are displayed on the display unit as the list for each abnormality, it is possible to visually recognize the cause element for addressing the abnormality and the feature quantity for controlling the cause element. For example, even when the cause elements are the same, the feature quantity to be controlled may differ depending on the abnormality and thus, it is possible to easily know which of the feature quantities is to be controlled by viewing the list.

In the display system, the input unit can receive a selection of one of the cause elements from the list, and the control unit can be configured to highlight the selected cause element in the causal relationship model displayed on the display unit.

With this configuration, it is possible to highlight the cause element in the causal relationship model displayed on the display unit by selecting the cause element from the list. Therefore, the user can easily visually recognize a position of the selected cause element on the schematic illustration, for example.

A display method according to the present invention is a display method for displaying, on a display unit, a causal relationship of abnormalities that can occur in production equipment, the production equipment producing a product and including one or more driving means configured to perform driving of the production equipment and one or more monitoring means configured to perform monitoring of the production, the display method including: storing schematic illustration data representing a schematic illustration of the production equipment; storing causal relationship model data in which one or more cause elements of one or more abnormalities in the production equipment are selected from among the driving means and the monitoring means and represented as a causal relationship model together with a relationship between the cause elements; and displaying the schematic illustration and the causal relationship model on the display unit so that the causal relationship model is superimposed on the schematic illustration so as to correspond to the schematic illustration.

A non-transitory computer-readable recording medium recording a display program according to the present invention records a display program for displaying, on a display unit, a causal relationship of abnormalities that can occur in production equipment, the production equipment producing a product and including one or more driving means configured to perform driving of the production equipment and one or more monitoring means configured to perform monitoring of the production, the display program causing a computer to execute: storing schematic illustration data representing a schematic illustration of the production equipment; storing causal relationship model data in which one or more cause elements of one or more abnormalities in the production equipment are selected from among the driving means and the monitoring means and represented as a causal relationship model together with a relationship between the cause elements; and displaying the schematic illustration and the causal relationship model on the display unit so that the causal relationship model is superimposed on the schematic illustration so as to correspond to the schematic illustration.

Effects

According to the present invention, it is possible to easily confirm the cause of the abnormality that can occur in the production equipment.

DESCRIPTION OF THE EMBODIMENTS

Hereinafter, an embodiment according to an aspect of the present invention (hereinafter also referred to as an "embodiment") will be described with reference to the drawings. However, embodiments to be described below are merely examples of the present invention in all respects. Needless to say, various improvements or modifications can be made without departing from the scope of the present invention. That is, a specific configuration according to the embodiment may be appropriately adopted in carrying out the present invention. Although data appearing in the present embodiment is described in natural language, more specifically, the data is designated in a pseudo language, a command, a parameter, a machine language, or the like that can be recognized by a computer.

1. Application Example

Figure 1:
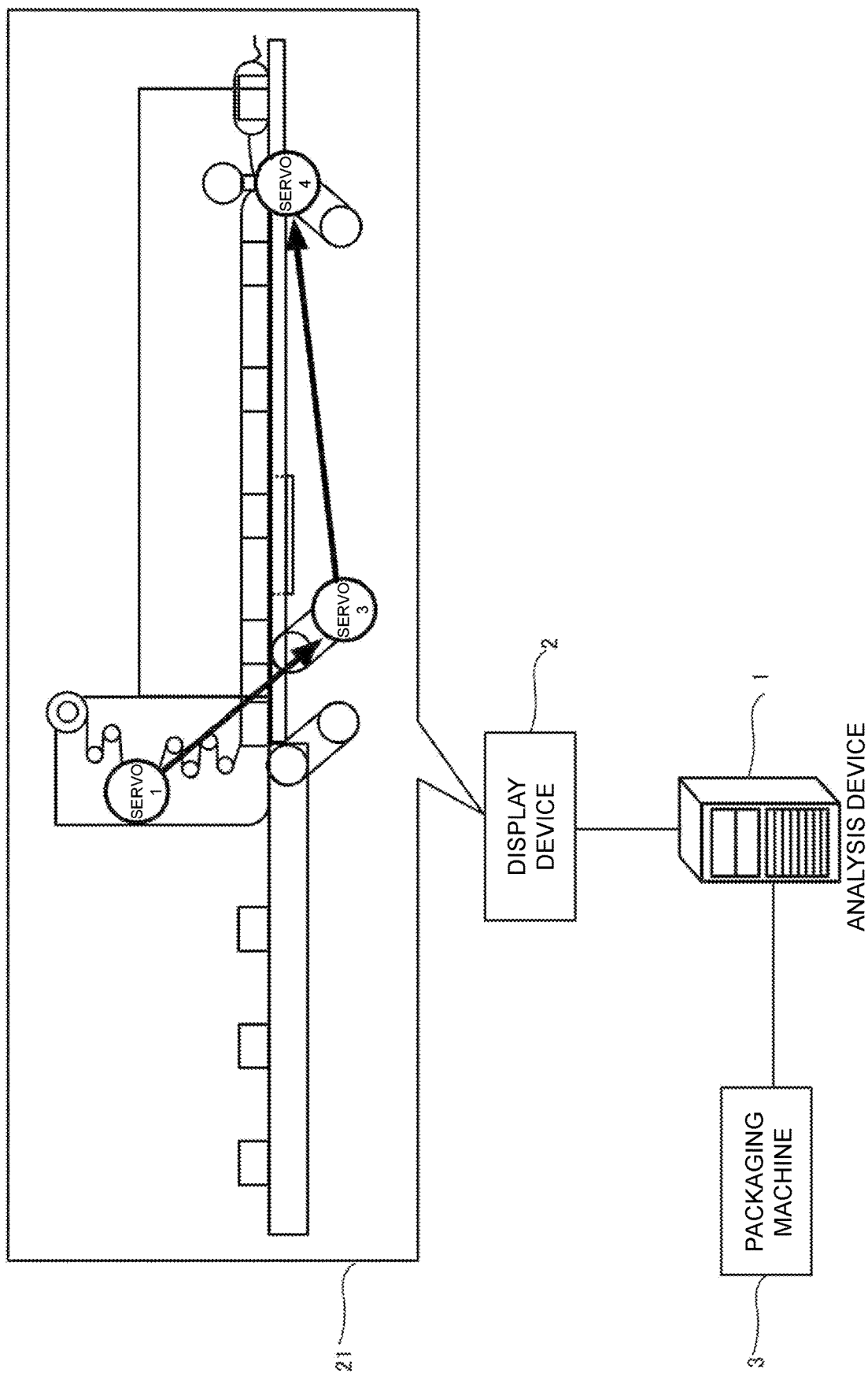
FIG. 1 schematically illustrates an example of a scene in which the present invention is applied.

First, an example of a scene in which the present invention is applied will be described with reference to FIG. 1. FIG. 1 schematically illustrates an example of an application scene of a production system according to the present embodiment. The production system according to the present embodiment includes a packaging machine 3 that is an example of production equipment, an analysis device 1, and a display device 2. The analysis device 1 is a computer configured to derive a causal relationship between servomotors (driving units) or various sensors (monitoring units) provided in the packaging machine 3 and display the causal relationship. Hereinafter, driving units such as servomotors or monitoring units such as various sensors are collectively referred to as mechanisms. Further, a cause element according to the present invention corresponds to a mechanism that causes an abnormality when the abnormality occurs, among the mechanisms.

The analysis device 1 generates a causal relationship model between the mechanisms for an abnormality that may occur in the packaging machine 3, and displays this causal relationship model on a screen 21 of the display device 2. In the example of FIG. 1, a causal relationship model when abrasion of a leather belt for a brake of a film roll 30 (see FIG. 3), which will be described below, occurs as an abnormality is shown. That is, servos 1, 3 and 4 among a plurality of servomotors provided in the packaging machine 3 are displayed as nodes and are connected by edges. A direction of the edge represents the causal relationship. That is, it is shown that when the abrasion of the leather belt occurs, the servo 1 affects the servo 3 and the servo 3 affects a servo 4, resulting in the abrasion of the leather belt. Therefore, an operator of the packaging machine 3 may confirm the cause of the abnormality in an order of the servos 4, 3 and 1. However, although details will be described below, each servomotor has a plurality of controllable feature quantities such as a torque and a position, and any of the feature quantities of the servomotor establishes the causal relationship.

Further, as illustrated in the example of FIG. 1, a schematic illustration of the packaging machine 3 is displayed on the display device 2, and a causal relationship model is superimposed on the schematic illustration. In this case, each of the nodes of the causal relationship model is arranged at a position at which each servomotor is provided in the schematic illustration of the packaging machine 3. Therefore, an operator can specify a mechanism that causes an abnormality while viewing the schematic illustration. Therefore, in the packaging machine 3, it is possible to easily visually recognize which of the mechanisms is to be confirmed for return from the abnormality to normality.

In the above description, the packaging machine 3 is shown as an example of the production equipment, but it is sufficient as long as the production equipment can produce something, and a type thereof may not be particularly limited. A type of each mechanism may not be particularly limited, and may be appropriately selected depending on embodiments. Examples of the respective mechanisms may be a conveyor, a robot arm, a servomotor, a cylinder (a molding machine or the like), a suction pad, a cutter device, and a sealing device. In addition to the packaging machine 3 described above, each mechanism may be a complex device such as a printing machine, a mounting machine, a reflow furnace, or a substrate inspection device. Further, examples of the respective mechanisms include a device that detects some information using various sensors, a device that acquires data from various sensors, a device that detects some information from acquired data, and a device that performs internal processing such as a device that performs information processing on acquired data, in addition to the device involving some physical operation as described above. One mechanism may be configured of one or a plurality of devices or may be configured of some of the devices. One device may be configured of a plurality of mechanisms. Further, when the same device executes a plurality of processes, each may be regarded as a separate mechanism. For example, when the same device executes a first process and a second process, the device that executes the first process may be regarded as a first mechanism, and the device that executes the second process may be regarded as a second mechanism.

2. Configuration Example

2-1. Hardware Configuration

Figure 2:
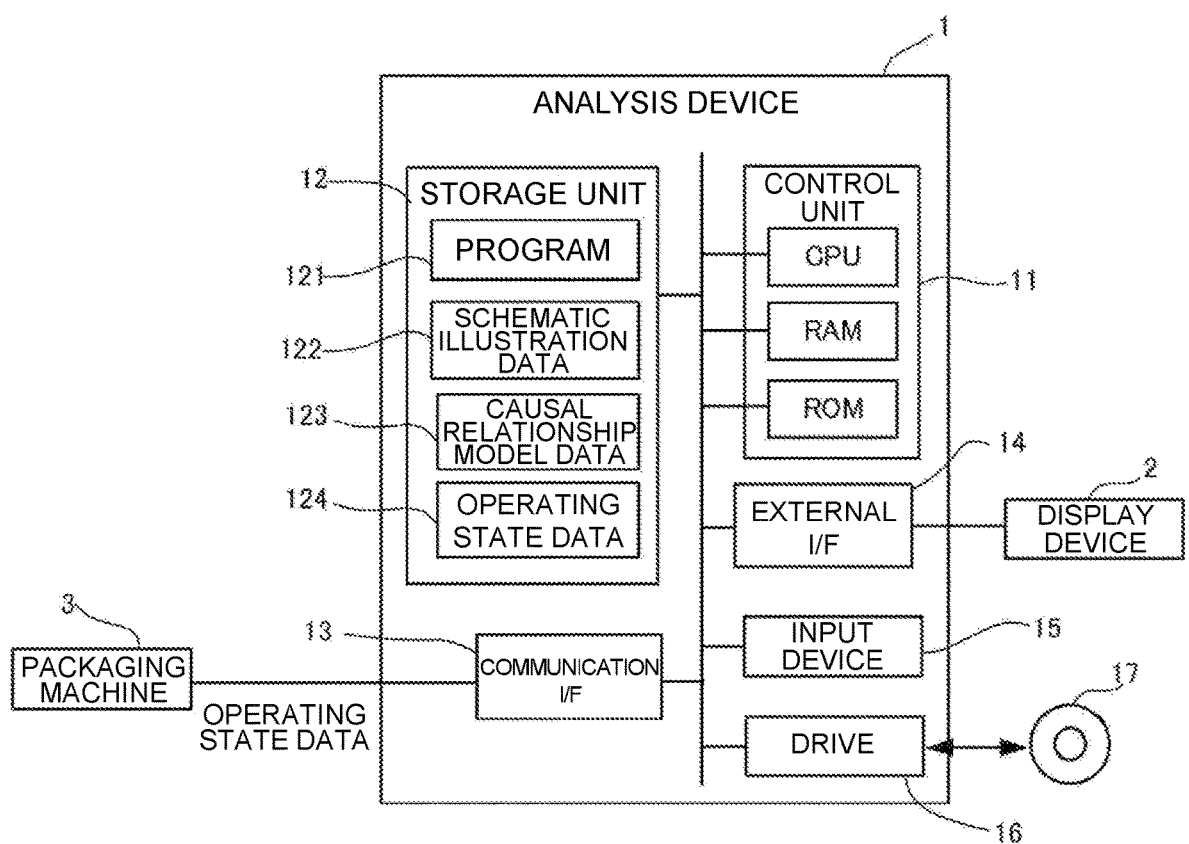
FIG. 2 is a block diagram illustrating a hardware configuration of an analysis device according to an embodiment of the present invention.
Figure 3:
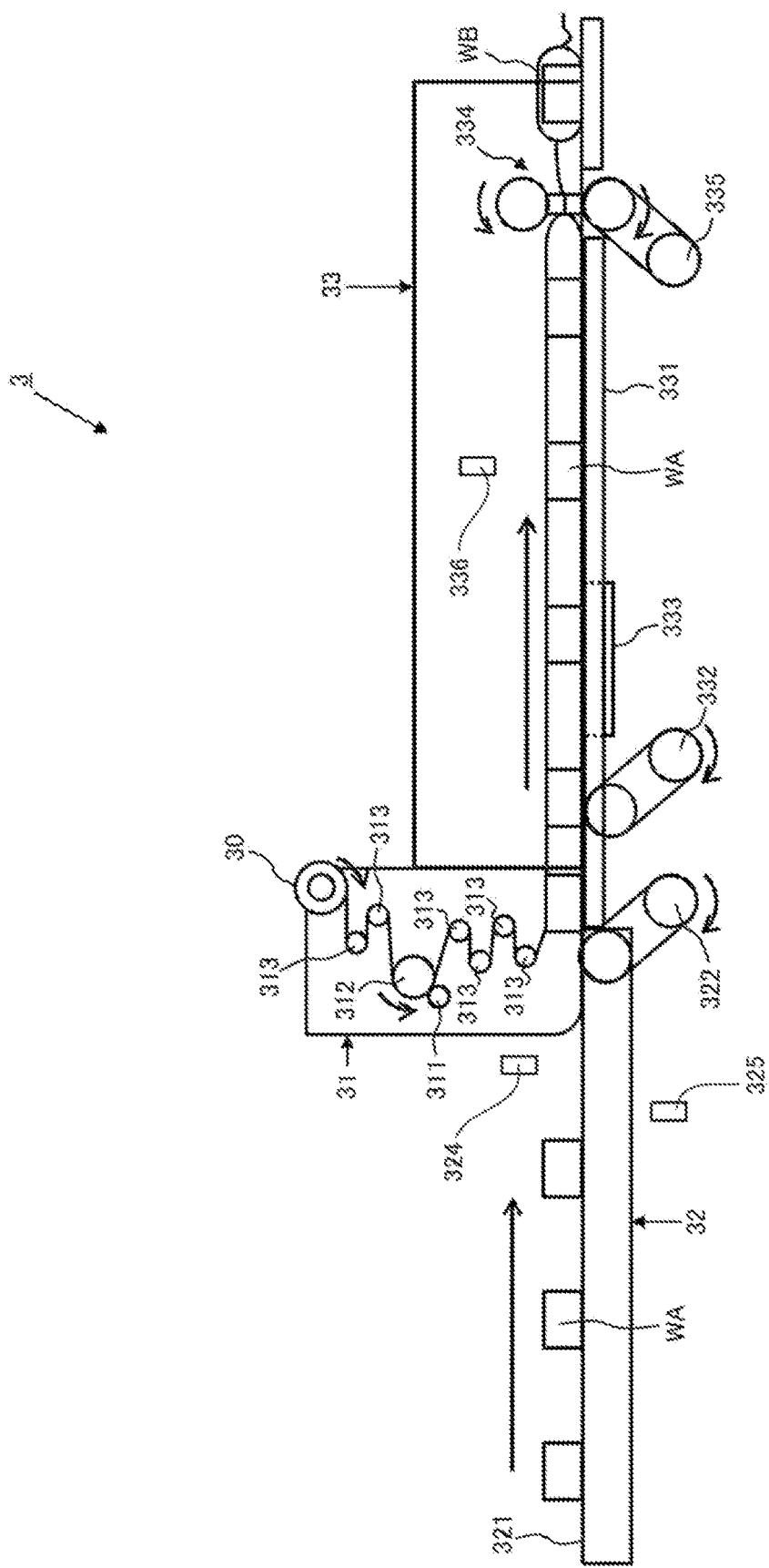
FIG. 3 is a schematic diagram of production equipment according to an embodiment of the present invention.

Next, an example of a hardware configuration of the production system according to the present embodiment will be described. FIG. 2 is a block diagram illustrating an example of the hardware configuration of the analysis device 1 according to the present embodiment, and FIG. 3 is a diagram illustrating a schematic configuration of the packaging machine.

2-1-1. Analysis Device

First, an example of the hardware configuration of the analysis device 1 according to the present embodiment will be described with reference to FIG. 2. As illustrated in FIG. 2, the analysis device 1 is a computer in which a control unit 11, a storage unit 12, a communication interface 13, an external interface 14, an input device 15, and a drive 16 are electrically connected.

The control unit 11 includes a central processing unit (CPU), a random access memory (RAM), a read only memory (ROM), and the like, and controls each component according to information processing. The storage unit 12 is, for example, an auxiliary storage device such as a hard disk drive or a solid state drive, and stores a program 121 to be executed by the control unit 11, schematic illustration data 122, causal relationship model data 123, operating state data 124, and the like.

The program 121 is a program for performing generation of a causal relationship model between an abnormality occurring in the packaging machine 3 and a mechanism, a display of the causal relationship model on the display device 2, or the like. The schematic illustration data 122 is data representing a schematic illustration of production equipment that is a target, and is data representing the schematic illustration of the packaging machine 3 in the embodiment. The schematic illustration may be at least a schematic illustration of the entire packaging machine so that at least the positions of the mechanisms shown in the causal relationship model can be understood, and is not necessarily a detailed diagram. Further, the schematic illustration may be an enlarged view illustrating only a part of the packaging machine 3.

The causal relationship model data 123 is data representing a causal relationship model of abnormal occurrence constructed by a feature quantity of each mechanism extracted from the packaging machine 3. That is, the causal relationship model data 123 is data representing a causal relationship between mechanisms when an abnormality occurs. In this analysis device 1, although the causal relationship model data is generated according to, for example, the feature quantity extracted from the packaging machine 3 as will be described below, causal relationship model data generated in advance by an external device can also be stored.

The operating state data 124 is data representing an operating state of the packaging machine 3. Although details will be described below, for example, the operating state data 124 can be data that can be generated in driving each mechanism described above, such as measurement data such as torque, speed, acceleration, temperature, and pressure. Further, when the mechanism is a sensor, the operating state data 124 may be detection data in which a detection result such as the presence or absence of content WA is indicated as "on" or "off".

The communication interface 13 is, for example, a wired local area network (LAN) module, a wireless LAN module, or the like, and is an interface for performing wired or wireless communication. That is, the communication interface 13 is an example of a communication unit configured to perform communication with another device. The analysis device 1 of the present embodiment is connected to the packaging machine 3 via the communication interface 13.

The external interface 14 is an interface for connection to an external device, and is appropriately configured according to an external device that is a connection target. In the present embodiment, the external interface 14 is connected to the display device 2. As the display device 2, a known liquid crystal display, touch panel display, or the like may be used.

The input device 15 is, for example, a device for performing input such as a mouse or a keyboard.

The drive 16 is, for example, a compact disk (CD) drive, a digital versatile disk (DVD) drive, or the like, and is a device for reading a program stored in a storage medium 17. A type of the drive 16 may be appropriately selected according to the type of storage medium 17. At least some of various types of data 122 to 124 including the program 121 stored in the storage unit may be stored in the storage medium 17.

The storage medium 17 is a medium that stores information on a program or the like through electrical, magnetic, optical, mechanical, or chemical actions so that a computer or other devices, machine, or the like can read the recorded information. In FIG. 2, a disc-type storage medium such as a CD or DVD is illustrated as an example of the storage medium 17. However, a type of the storage medium 17 is not limited to the disc type, and may be a type other than the disc type. An example of a storage medium other than the disc type storage medium includes a semiconductor memory such as flash memory.

For a specific hardware configuration of the analysis device 1, components can be omitted, replaced, or added appropriately according to embodiments. For example, the control unit 11 may include a plurality of processors. The analysis device 1 may be configured of a plurality of information processing devices. Further, as the analysis device 1, a general-purpose server device or the like may be used in addition to an information processing device designed exclusively for services to be provided.

2-1-2. Packaging Machine

Next, an example of a hardware configuration of the packaging machine 3 according to the present embodiment will be described with reference to FIG. 3. FIG. 3 schematically illustrates an example of the hardware configuration of the packaging machine 3 according to the present embodiment. The packaging machine 3 is a so-called horizontal pillow packaging machine, which is a device that packages content WA such as food (dried noodles, or the like) and stationery (eraser, or the like). However, a type of the content WA can be appropriately selected according to the present embodiment and is not particularly limited. This packaging machine 3 includes a film roll 30 on which a package film is wound, a film conveyance unit 31 that conveys the package film, a content conveyance unit 32 that conveys the content WA, and a bag making unit 33 that packages the content with the package film.

The packaging film can be, for example, a resin film such as a polyethylene film. The film roll 30 includes a winding core, and the packaging film is wound around the winding core. The winding core is supported rotatably around a shaft, so that the film roll 30 is configured to be able to feed the packaging film while rotating.

The film conveyance unit 31 includes a drive roller that is driven by a servomotor (servo 1) 311, a passive roller 312 to which a rotational force is imparted from the drive roller, and a plurality of pulleys 313 that guide the packaging film while applying tension. Accordingly, the film conveyance unit 31 is configured to be able to feed the package film from the film roll 30 and convey the fed package film to the bag making unit 33 without looseness of the package film.

The content conveyance unit 32 includes a conveyor 321 that conveys the content WA that is a packaging target, and a servomotor (servo 2) 322 that drives the conveyor 321. As illustrated in FIG. 3, the content conveyance unit 32 is connected to the bag making unit 33 via below the film conveyance unit 31. Accordingly, the content WA conveyed by the content conveyance unit 32 is supplied to the bag making unit 33 and packaged with the packaging film supplied from the film conveyance unit 31. Further, regarding information downstream of the conveyor 321, a fiber sensor (sensor 1) 324 that detects a position of the content WA is provided. Further, a fiber sensor (sensor 2) 325 that detects, for example, riding of the content WA is provided below the conveyor 321. These sensors 1 and 2 detect whether or not the content WA is conveyed in a correct position so that the content WA is correctly packaged.

The bag making unit 33 includes a conveyor 331, a servo motor (servo 3) 332 that drives the conveyor 331, a center sealing unit 333 that seals the packaging film in a conveyance direction, and an end sealing unit 334 that that cuts the packaging film on both end sides in the conveyance direction and seals the packaging film at each end portion.

The conveyor 331 conveys the content WA conveyed from the content conveyance unit 32 and the packaging film supplied from the film conveyance unit 31. The packaging film supplied from the film conveyance unit 31 is supplied to the center sealing unit 333 while being appropriately bent so that both side edge portions in the width direction overlap each other. The center sealing unit 333 is configured of, for example, a pair of left and right heating rollers (heaters 1 and 2), and seals both the bent side edge portions of the packaging film in the conveyance direction by heating. Accordingly, the packaging film is formed in a tubular shape. The content WA is put into the packaging film formed in this tubular shape. Further, a fiber sensor (sensor 3) 336 that detects the position of the content WA is provided above the conveyor 331 upstream from the end sealing unit 334.

On the other hand, the end sealing unit 334 includes, for example, a roller that is driven by a servomotor 335, a pair of cutters that are opened and closed due to rotation of the roller, and heaters (heaters 3) provided on both sides of each cutter. Accordingly, the end sealing unit 334 is configured to be able to cut the packaging film in the tubular shape cut in a direction orthogonal to the conveyance direction and seal the packaging film by heating at a cut portion. When the packaging film passes through the end sealing unit 334, a tip portion of the packaging film formed in the tubular shape is sealed on both the sides in the conveyance direction and separated from a subsequent portion, resulting in a packaging body WB containing the content WA.

2-1-3. Packaging Process

The above-described packaging machine 3 can package the content WA in the following processes. That is, the film conveyance unit 31 feeds the packaging film from the film roll 30. Further, the content conveyance unit 32 conveys the content WA that is a packaging target. Next, the center sealing unit 333 of the bag making unit 33 forms the fed packaging film into a tubular shape. After the content WA is put into the formed packaging film in the tubular shape, the packaging film in the tubular shape is cut in the direction orthogonal to the conveyance direction by the end sealing unit 334 and sealed at both the sides of the cut portion in the conveyance direction by heating. Accordingly, a horizontal pillow type of package WB containing the content WA is formed. That is, the packaging of the content WA is completed.

Control of driving of the packaging machine 3 can be performed by, for example, a PLC provided separately from the packaging machine 3. In this case, the above-described operating state data 124 can be acquired from the PLC. Further, in the packaging machine 3 configured as described above, 10 mechanisms are set in order to establish a causal relationship of the abnormality as an example. That is, the servos 1 to 4, the heaters 1 to 3, and the sensors 1 to 3 described above are set as mechanisms, and a causal relationship between these mechanisms when an abnormality occurs is constructed as a causal relationship model. Details will be described below.

2-2. Functional Configuration

Figure 4:
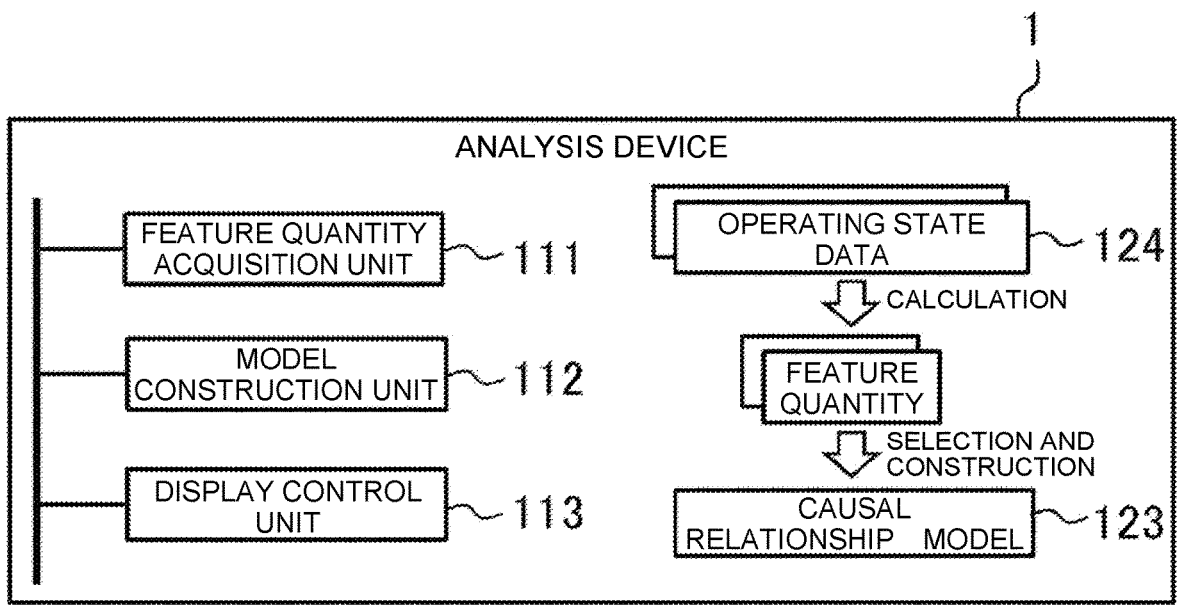
FIG. 4 is a block diagram illustrating a functional configuration of the analysis device.

Next, a functional configuration (software configuration) of the analysis device 1 will be described. FIG. 4 is an example of the functional configuration of the analysis device 1 according to the present embodiment. The control unit 11 of the analysis device 1 loads a program 8 stored in the storage unit 12 into the RAM. The control unit 11 interprets and executes the program 8 loaded into the RAM using the CPU to control each component. Accordingly, as illustrated in FIG. 4, the analysis device 1 according to the present embodiment functions as a computer including a feature quantity acquisition unit 111, a model construction unit 112, and a display control unit 113.

The feature quantity acquisition unit 111 acquires values of a plurality of types of feature quantities calculated from the operating state data 124 representing the operating state of the packaging machine 3 at the time of normality when the packaging machine 3 normally forms the packaging body WB and the time of abnormality time when an abnormality occurs in the formed packaging body WB. The model construction unit 112 selects a feature quantity effective for prediction of the abnormality from among the plurality of types of acquired feature quantities on the basis of a predetermined algorithm for deriving a degree of association of an abnormality occurring in the formed package WB with each type of feature quantity from the values of the respective types of feature quantities at the time of normality and the time of abnormality that have been acquired. Using the selected feature quantity, a causal relationship model 123 representing the causal relationship between the mechanisms when the abnormality occurs is constructed.

The display control unit 113 has a function of displaying the schematic illustration of the packaging machine 3, the causal relationship model, various feature quantities, and the like described above on the screen 21 of the display device 2. In addition, the display control unit 113 performs control for displaying various types of information on the screen 21 of the display device 2.

Each function of the analysis device 1 will be described in detail in an operation example to be described below. In the present embodiment, an example in which all of the above functions are realized by a general-purpose CPU is described. However, some or all of the above functions may be realized by one or more dedicated processors. Further, for the functional configuration of the analysis device 1, functions may be omitted, replaced, or added appropriately according to embodiments.

3. Operation Example

Next, an operation example of the production system configured as described above will be described.

3-1. Creation of Causal Relationship Model

Figure 5:
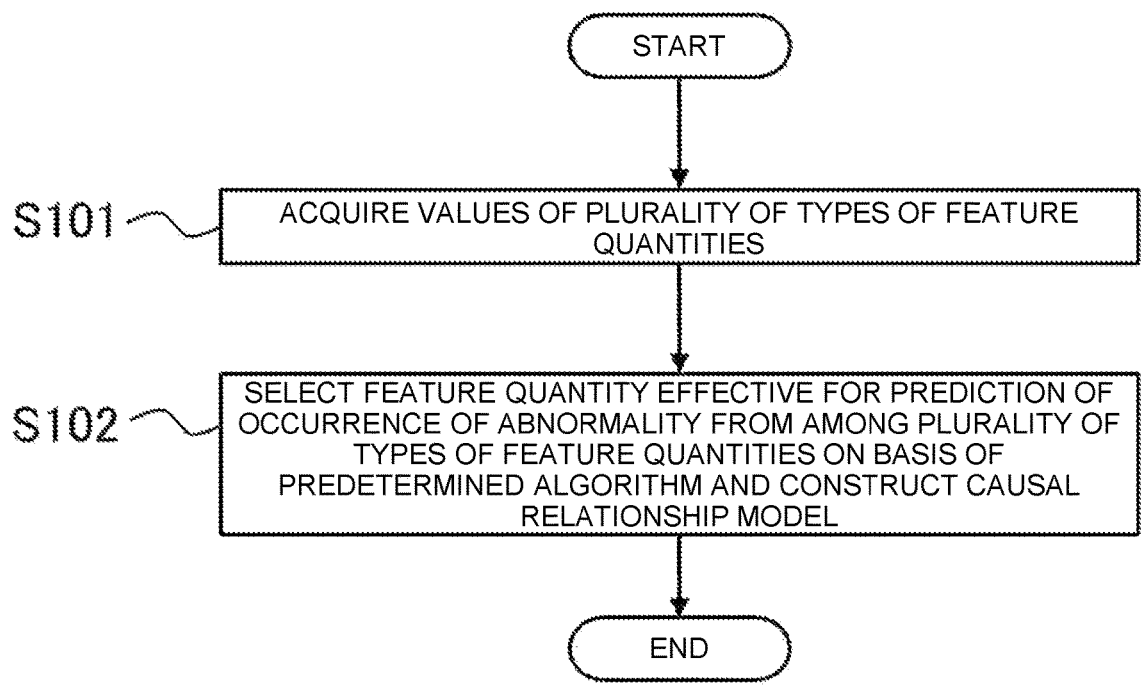
FIG. 5 is a flowchart illustrating an example of construction of a causal relationship model.

First, a processing procedure when the analysis device creates the causal relationship model will be described with reference to FIG. 5. FIG. 5 illustrates an example of a processing procedure of the analysis device when the causal relationship model is created.

Step S101

Initially, in step S101, the control unit 11 of the analysis device 1 functions as the feature quantity acquisition unit 111, and acquires the values of the plurality of types of feature quantities calculated from the operating state data 124 representing the operating state of the packaging machine 3 at the time of normality when the packaging machine 3 normally forms the packaging body WB and the time of abnormality when an abnormality occurs in the formed packaging body WB.

Specifically, first, the control unit 11 performs classifying into the time of normality and the time of abnormality and collects the operating state data 124. A type of operating state data 124 to be collected is not particularly limited as long as the data is data representing the state of the packaging machine 3, but in the present embodiment, the operating state data 124 can be data that can be generated in driving each mechanism described above, such as measurement data such as torque, speed, acceleration, temperature, and pressure.

Figure 6:
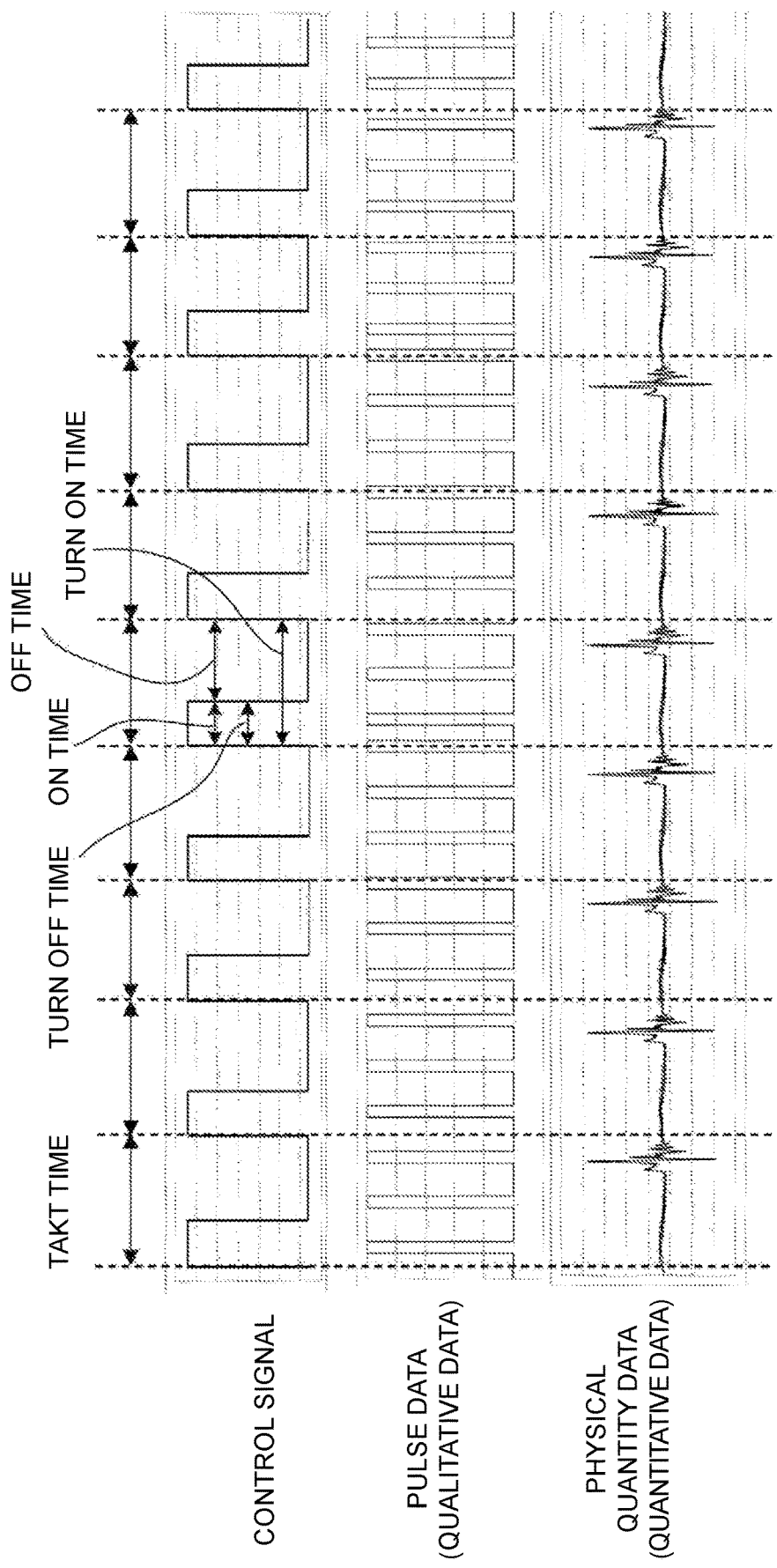
FIG. 6 illustrates an example of a relationship between a control signal and a takt time.

When the mechanism is a sensor, measurement data such as ON time, OFF time, turn ON time, and turn OFF time may be the operating state data 124. As illustrated in FIG. 6 to be described below, the ON time and the OFF time are total times in which the control signal is ON or OFF in a frame that is a target, and the turn ON time and the turn OFF time are times until the control signal is turned ON or OFF for the first time in the frame that is a target. In addition, the control unit 11 can acquire a detection result of each sensor, such as detection data representing presence or absence of the content WA as "on" and "off", as the operating state data 124. The collected operating state data 124 may be stored in the storage unit 12 or may be stored in an external storage device.

Next, the control unit 11 divides the collected operating state data 124 into frames in order to define a processing range for calculating the feature quantity. For example, the control unit 11 may divide the operating state data 124 into frames having a fixed time length. However, the packaging machine 3 does not always operate at regular time intervals. Therefore, when the operating state data 124 is divided into frames having a fixed time length, the operation of the packaging machine 3 reflected in each frame is likely to deviate.

Therefore, in the present embodiment, the control unit 11 divides the operating state data 124 into frames for each takt time. The takt time is a time taken to produce a predetermined number of products, that is, to form a predetermined number of packages WB. This takt time can be specified on the basis of a signal for controlling the packaging machine 3, for example, a control signal for controlling an operation of each servomotor of the packaging machine 3.

A relationship between the control signal and the takt time will be described with reference to FIG. 6. FIG. 6 schematically illustrates the relationship between the control signal and the takt time. As illustrated in FIG. 6, a control signal for production equipment that repeats production of products such as the packaging machine 3 is a pulse signal in which "on" and "off" appear periodically according to production of a predetermined number of products.

For example, in the control signal illustrated in FIG. 6, "on" and "off" appear once while one package WB is formed. Therefore, the control unit 11 can acquire this control signal from the packaging machine 3, and set a time from rising ("on") of the acquired control signal to the next rising ("on") as the takt time. The control unit 11 can divide the operating state data 124 into frames for each takt time, as illustrated in FIG. 6.

A type of control signal may not be particularly limited as long as the control signal is a signal that can be used to control the packaging machine 3. For example, when the packaging machine 3 includes a sensor for detecting a mark attached to the packaging film, and an output signal of this sensor is used for adjustment of a feed amount of the packaging film, the output signal of the sensor may be used as the control signal.

Next, the control unit 11 calculates a value of the feature quantity from each frame of the operating state data 124. The type of feature quantity is not particularly limited as long as the feature quantity indicates features of the production equipment.

For example, when the operating state data 124 is quantitative data (physical quantity data in FIG. 6) such as the measurement data, the control unit 11 may calculate an amplitude, a maximum value, a minimum value, an average value, a variance value, a standard deviation, an autocorrelation coefficient, a maximum value of a power spectrum obtained through Fourier transform, skewness, kurtosis, and the like in the frame as feature quantities.

Further, for example, when the operating state data 124 is qualitative data (pulse data in FIG. 6) such as the detection data, the control unit 11 may calculate an "on" time, an "off" time, a duty ratio, the number of "on", the number of "off", and the like in each frame as feature quantities.

Further, the feature quantity may be derived not only from single operating state data 124 but also from a plurality of pieces of operating state data 124. For example, the control unit 11 may calculate a mutual correlation coefficient, ratio, difference, synchronization deviation amount, distance, or the like between corresponding frames of two types of operating state data 124 as feature quantities.

The control unit 11 calculates a plurality of types of feature quantities as described above from the operating state data 124. Accordingly, the control unit 11 can acquire values of the plurality of types of feature quantities calculated from the operating state data 124 for each of the time of normality and the time of abnormality. A process from the collection of the operating state data 124 to the calculation of the values of the feature quantities may be performed not by the analysis device 1 but by the packaging machine 3 or various devices that control the packaging machine 3. Further, the control unit 11 may discretize the value of each type of feature quantity, for example, set a state higher than a threshold value to "1" or "high" and a state lower than the threshold value to "0" or "low".

Step S102

Next, in step S102, the control unit 11 functions as the model construction unit 112, and selects a feature quantity effective for prediction of the abnormality from among the plurality of types of acquired feature quantities on the basis of a predetermined algorithm for specifying a degree of association of an abnormality occurring in the formed package WB with each type of feature quantity from the values of the respective types of feature quantities at the time of normality and the time of abnormality acquired in step S101.

A predetermined algorithm may be configured using, for example, a Bayesian network. The Bayesian network is one graphical modeling in which a causal relationship between a plurality of random variables is expressed by a directional non-circulation graph structure and a causal relationship between the respective random variables is expressed by a conditional probability.

The control unit 11 treats each of the acquired feature quantities and a state of the package WB as random variables, that is, sets each acquired feature quantity and the state of the package WB in each node to construct a Bayesian network, such that a causal relationship between each feature quantity and the state of the package WB can be derived. A known method may be used for the construction of the Bayesian network. For example, a structural learning algorithm such as a greedy search algorithm, a stingy search algorithm, or a full search method can be used to construct the Bayesian network. Further, Akaike's. Information Criterion (AIC), C4.5, Cooper Herskovits Measure (CHM), Minimum Description Length (MDL), Maximum Likelihood (ML), or the like can be used as an evaluation criterion of the Bayesian network to be constructed. Further, a pairwise method, a listwise method, or the like can be used as a processing method in a case in which a missing value is included in learning data (the operating state data 124) used for construction of the Bayesian network.

Figure 7A:
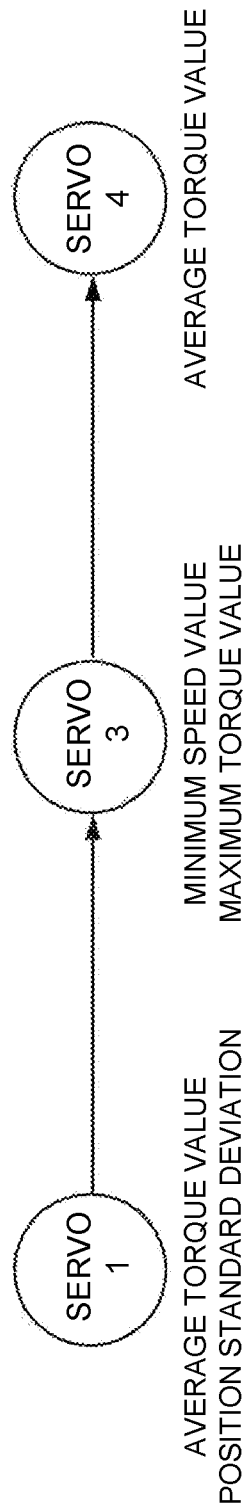
FIG. 7A illustrates an example of the causal relationship model.

For example, FIG. 7A illustrates a causal relationship model when the abrasion of the leather belt is the abnormality event. That is, a causal relationship model in which an average torque value and a standard deviation of a position, which are feature quantities of the servo 1, affect an average speed value and a maximum torque value, which are feature quantities of the servo 2, and the average speed value and the maximum torque value affect an average torque value of the servo 4 is constructed.

Figure 7B:
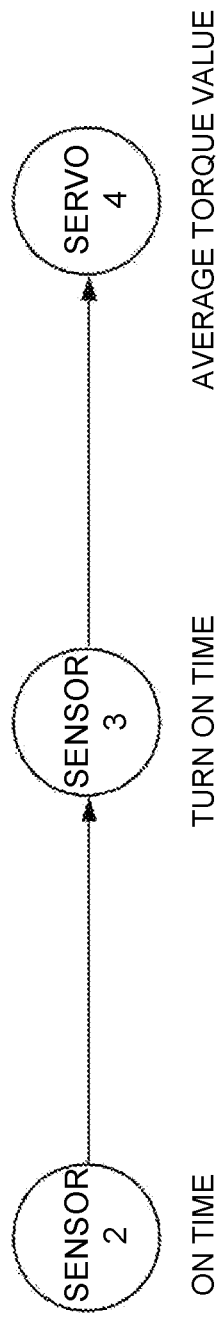
FIG. 7B illustrates an example of the causal relationship model.

FIG. 7B illustrates a causal relationship model when looseness of a chain of the conveyor 321 of the content conveyance unit 32 is the abnormality event. That is, a causal relationship model in which an ON time, which is a feature quantity of the sensor 2, affects a turn ON time, which is a feature quantity of the sensor 3, and the turn ON time affects the average torque value of the servo 4 is constructed.

Figure 7C:
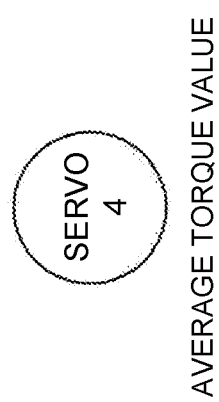
FIG. 7C illustrates an example of the causal relationship model.

FIG. 7C illustrates a causal relationship model when a defect of sealing of the packaging film is an abnormality event. A causal relationship model in which only the average torque value of the servo 4 is the cause of the abnormality event is constructed. The causal relationship model constructed in this way is stored in the storage unit 12 as the causal relationship model data 123.

A method of treating each of the acquired feature quantities and the state of the package WB as random variables can be appropriately set according to embodiments. For example, an event in which the state of the package WB is normal is set as "0", an event in which an abnormality occurs in the package WB is set as "1", and a probability is associated with each of the events such that the state of the package WB can be regarded as the random variable. Further, for example, an event in which a value of each feature quantity is equal to or smaller than a threshold value is set to "0", an event in which the value of each feature quantity exceeds the threshold value is set to "1", and a probability is associated with each of the events such that the state of each feature quantity can be regarded as the random variable. However, the number of states set for each feature quantity may not be limited to two and may be three or more.

3-2. Display of Causal Relationship Model

Figure 8:
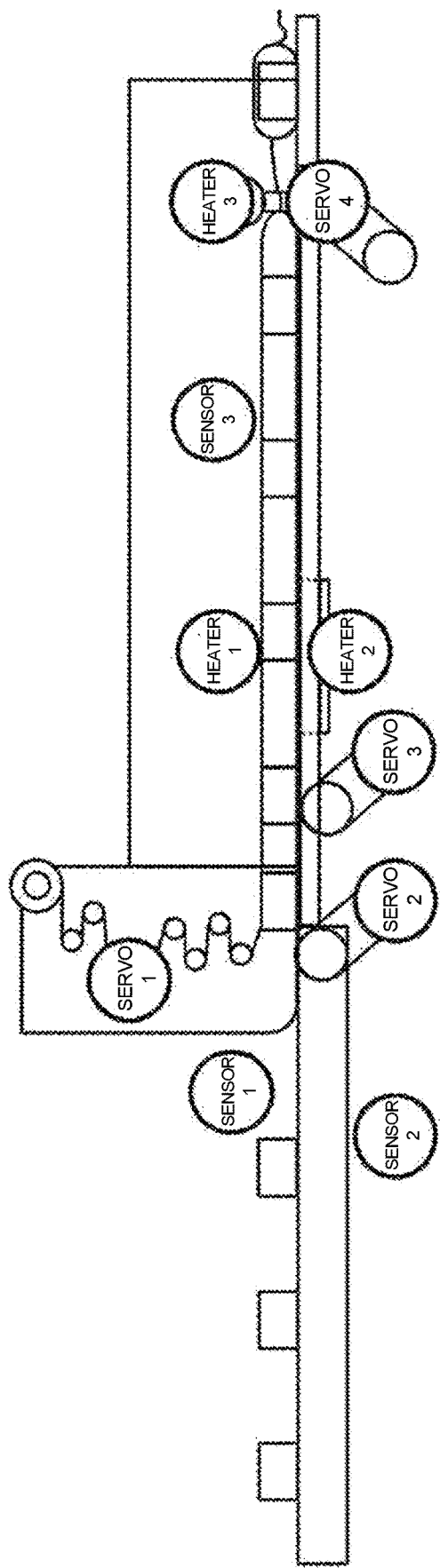
FIG. 8 illustrates a diagram in which nodes of the causal relationship model are superimposed on a schematic illustration of a packaging machine.

Next, a display of the causal relationship model constructed as described above will be described. In this case, the control unit 11 of the analysis device 1 functions as the display control unit 113. The display control unit 113 controls a display of the screen 21 shown below. First, the display control unit 113 displays a schematic illustration 122 read from the storage unit 12 on the screen 21 of the display device 2 so that the causal relationship model 123 described above is superimposed on the schematic illustration 122. FIG. 8 is a diagram in which a mechanism that can be a cause element of an abnormality event in the present embodiment is superimposed on the schematic illustration. Here, as described above, the servos 1 to 4, the heaters 1 to 3, and the sensors 1 to 3, which are the nodes of the causal relationship model, are disposed at positions in which these are installed in the schematic illustration. On the screen 21 of the display device 2 to be described below, a mechanism for constructing the causal relationship model is selected as a node from among the mechanisms according to an abnormality event selected by the user, and an edge indicated by an arrow indicating the causal relationship is displayed together with the node.

Figure 9A:
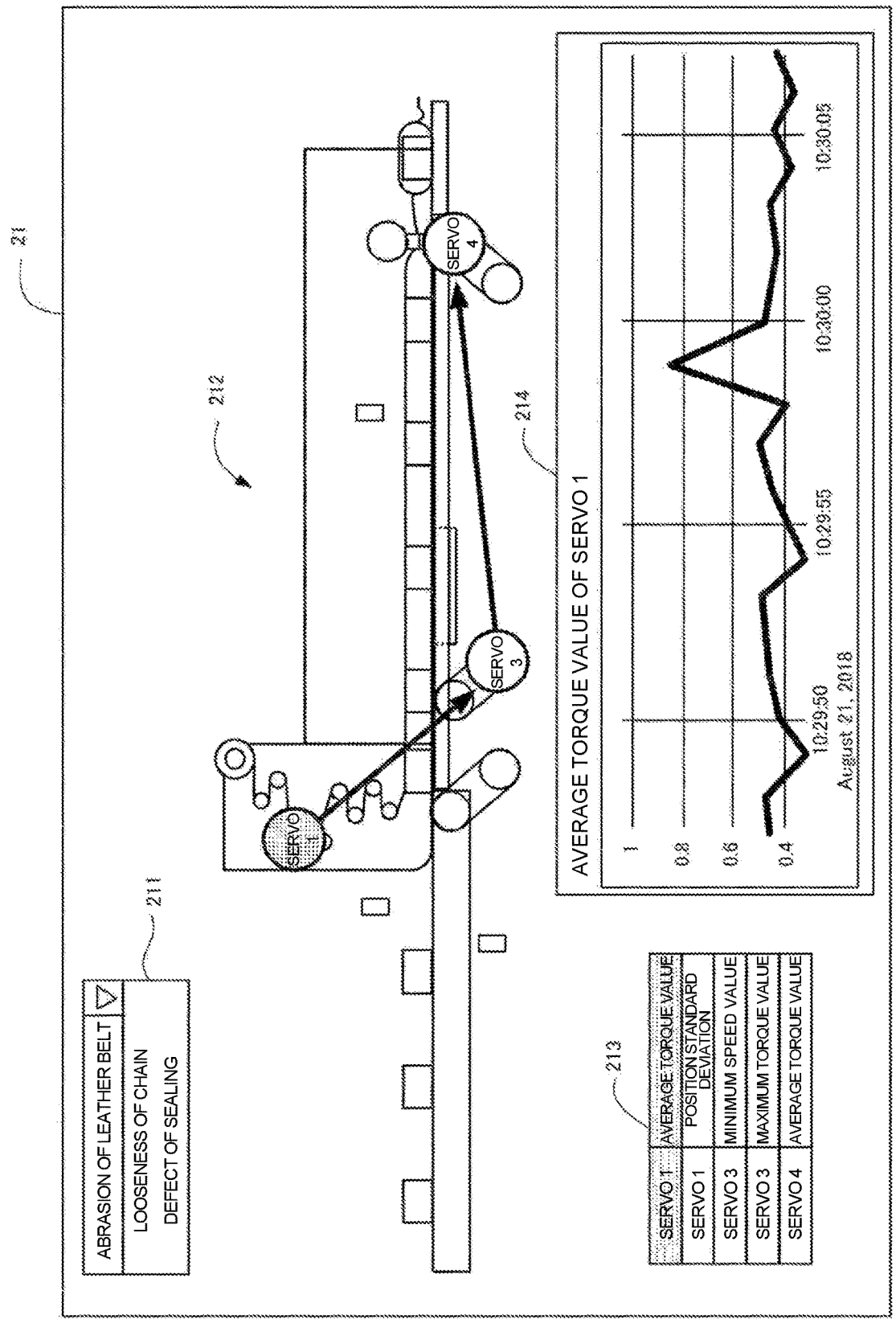
FIG. 9A illustrates an example of a screen of a display device.

FIG. 9A illustrates an example of the screen 21 of the display device 2 illustrating the causal relationship model. This screen 21 can be operated by the input device 15 described above. A selection box 211 for selecting an abnormality event is displayed on the upper left on the screen 21, and the abnormality event can be selected from a pull-down menu. In this example, abrasion of the leather belt, looseness of the chain, and a defect of sealing are shown as abnormality events, and the abrasion of the leather belt is selected from these.

An abnormality cause illustration 212 in which the schematic illustration of the packaging machine and the causal relationship model are superimposed is displayed on the lower side of the selection box 211. In the example of FIG. 9A, an abnormality cause illustration when the abnormality event is the abrasion of the leather belt is displayed. On the lower left of the abnormality cause illustration 212, a list 213 showing mechanisms that are cause elements and feature quantities thereof are displayed according to a selected abnormality event. The user can select any of the mechanisms and feature quantities from the list 213, and when any of the mechanisms and feature quantities are selected, the corresponding mechanism in the abnormality cause illustration 212 is highlighted. In this example, (servo 1-average torque value) is selected from the list 213, and servo 1 in the abnormality cause illustration 212 is highlighted. Various methods can be used for highlighting, and a display such as coloring and blinking may be performed for distinguishment from other nodes.

Further, a change in the selected feature quantity over time is displayed by a graph 214 on the right side of the list 213. In this example, since (servo 1-average torque value) is selected, a line graph 214 showing the change over time is displayed.

Figure 9B:
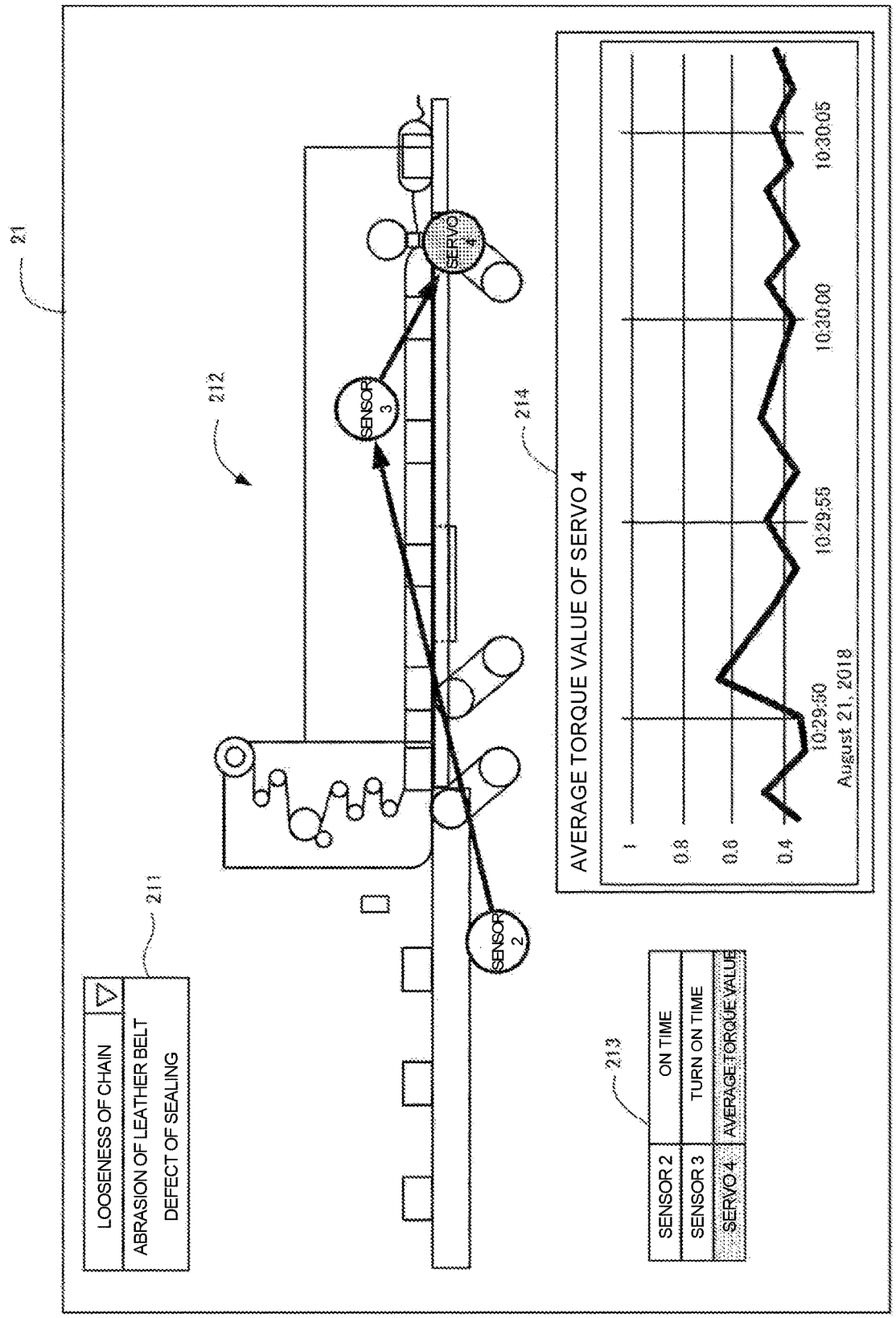
FIG. 9B illustrates an example of the screen of the display device.

FIG. 9B illustrates an example in which the looseness of the chain is displayed as the abnormality event in the box 211. Accordingly, in the list 213, mechanisms that cause the looseness of the chain and feature quantities thereof are displayed. Here, since (servo 4-average torque value) is selected, the servo 4 of the abnormality cause illustration 212 is emphasized, and a line graph 214 showing change in (servo 4-average torque value) over time is displayed.

Figure 9C:
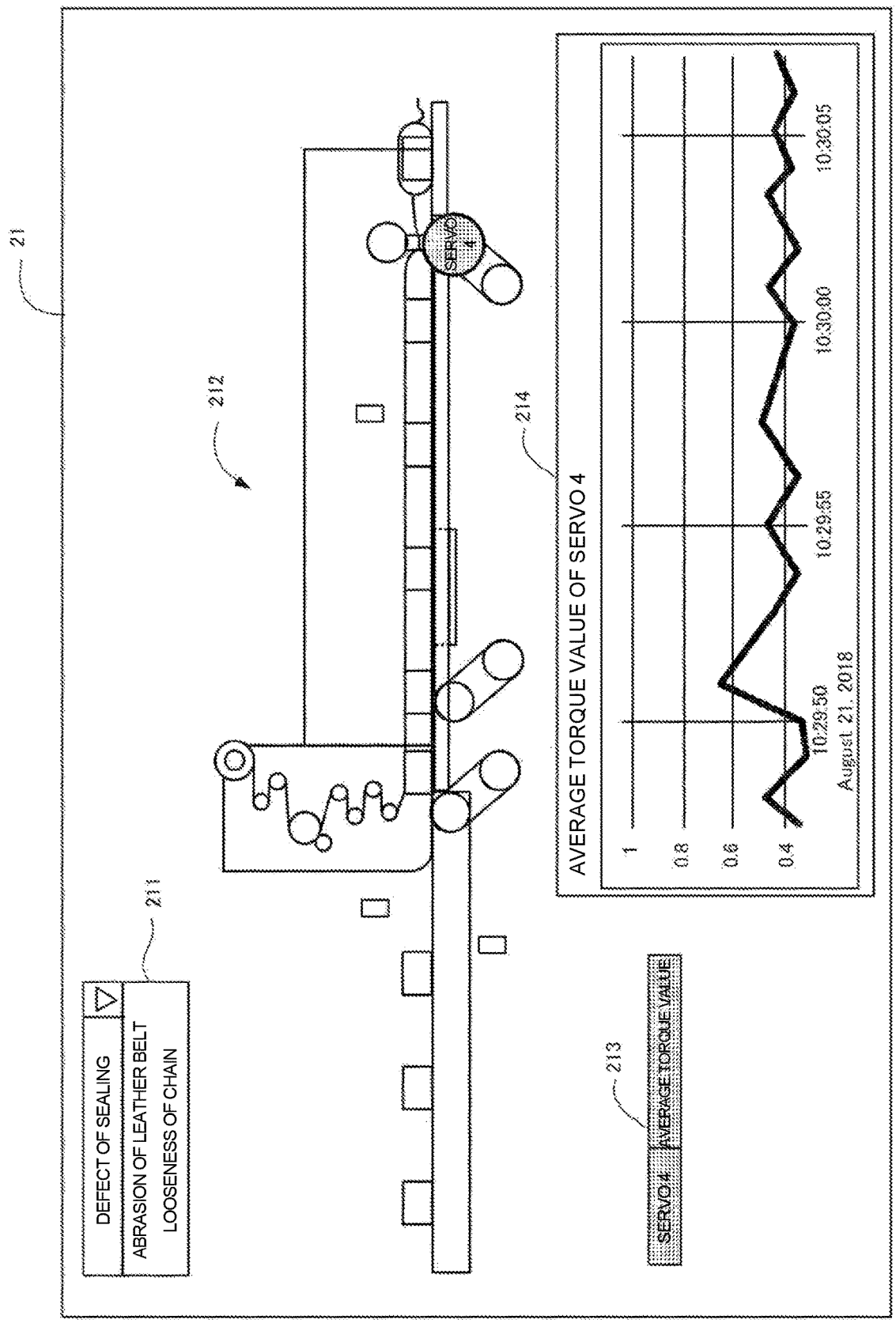
FIG. 9C illustrates an example of the screen of the display device.

FIG. 9C illustrates an example in which the defect of the sealing is displayed as the abnormality event in the box 211. Accordingly, mechanisms that cause the defect of the sealing and feature quantities thereof are displayed in the list 213. Here, since (servo 4-average torque value) is selected, the servo 4 in the abnormality cause illustration is emphasized, and a line graph 214 showing change of (servo 4-average torque value) over time is displayed.

An operation of the screen 21 are summarized below. First, the user selects an abnormality event to be confirmed from the selection box 211 using the input device 15. Accordingly, the display control unit 113 displays the abnormality cause illustration 212 and the list 213 corresponding to the selected abnormality event on the screen. When any of the feature quantities is selected from the list 213, the corresponding node of the abnormality cause illustration 212 is highlighted, and the graph 214 showing the change in the selected feature quantity over time is displayed. Therefore, the user can visually recognize the causal relationship related to the abnormality event while viewing the screen 21. The user can appropriately set a period of change in the feature quantity over time displayed in the graph 214.

4. Characteristics (1) According to the present embodiment, the schematic illustration of the packaging machine 3 and the causal relationship model related to the abnormality that may occur in the packaging machine 3 are displayed on the screen 21 of the display device 2. In this case, since the causal relationship model is superimposed and displayed on the screen 21 to correspond to the schematic illustration, the cause element included in the causal relationship model can be specified while the schematic illustration being viewed. Therefore, it is possible to easily visually recognize where the abnormality is occurring in the packaging machine 3.

(2) Since the cause element and the feature quantity corresponding thereto are displayed on the screen 21 as the list 213 for each abnormality event, it is possible to visually recognize the cause element for solving the abnormality and the feature quantity for controlling the cause element. For example, even when the cause elements are the same, the feature quantity to be controlled may differ depending on the abnormality and thus, it is possible to easily know which of the feature quantities is to be controlled by viewing the list 213.

(3) It is possible to highlight the cause element in the causal relationship model displayed on the screen 21 by selecting the cause element from the list 213. Therefore, the user can easily visually recognize the position of the cause element selected on the schematic illustration, for example.

5. Modification Example

Although the embodiments of the present invention have been described in detail above, the above description is merely an example of the present invention in all respects. Needless to say, various improvements or modifications can be made without departing from the scope of the present invention. For example, the following changes can be made. Hereinafter, the same components as those in the above embodiment are denoted with the same reference signs, and description of the same points as in the above embodiment will be omitted appropriately. The following modification examples can be combined appropriately.

5-1

In the above embodiment, the abnormality event selection box 211, the abnormality cause illustration 212, the list 213, and the graph 214 are displayed on the screen 21, but the present invention is not limited thereto, and at least the abnormality cause illustration 212 may be displayed. For example, since there may be one abnormality event depending on production equipment that is a target, the selection box 211 is also unnecessary in this case. Further, it is not necessary to display all the elements 211 to 214 on the screen 21, and the elements may be displayed separately on a plurality of screens so that the user can switch between the elements.

5-2

The construction of the causal relationship model illustrated in the above embodiment is an example, and other methods may be used. Further, the schematic illustration data 122 or the causal relationship model data 123 constructed by other devices can also be sequentially stored in the storage unit 12.

5-3

The present invention can also be applied to production equipment other than the packaging machine 3, and in this case, a mechanism for constructing a causal relationship model can be appropriately selected depending on the production equipment. Further, schematic illustration data related to a plurality of production equipment can be stored in the storage unit 12 and displayed on the display device 2 for each of corresponding production equipment.

5-4

The display system according to the present invention can be configured by the analysis device 1 and the display device 2 in the production system. Therefore, the display device 2 of the above embodiment corresponds to a display unit of the present invention, and the control unit 11 and the storage unit 12 of the analysis device 1 correspond to a control unit and a storage unit of the present invention. For example, the control unit, the storage unit, and the display unit according to the present invention can be configured by a tablet PC or the like.

What is claimed is:

1. A display system provided in production equipment including a packaging machine that produces a product and includes one or more driving means comprising a motor configured to perform driving of the production equipment and one or more monitoring means comprising a sensor configured to perform monitoring production of the production equipment, the display system comprising:
   a control unit comprising at least one processor;
   a display unit;
   a storage unit comprising a memory,
   wherein the storage unit is configured to store:
      schematic illustration data representing a schematic illustration of the production equipment;
      causal relationship model data specifying at least two cause elements including a first cause element and a second cause element that can cause a first abnormality to occur in the production equipment, the at least two cause elements are selected from among at least one of the one or more driving means or the one or more monitoring means and represented as a causal relationship model together with a relationship between the at least two cause elements; and
      operating state data to represent an operating state of the packaging machine, and
   wherein the control unit is configured to display the schematic illustration and the causal relationship model based on the operating state on the display unit so that the causal relationship model is superimposed on the schematic illustration so as to correspond to the schematic illustration,
   wherein in the causal relationship model data, a first node represents the first cause element, a second node represents the second cause element, and an arrow is drawn from the first node pointing to the second node, the arrow represents the relationship between the at least two cause elements indicating the first cause element affects the second cause element,
   wherein the causal relationship model data including the first node, the second node, and the arrow are superimposed on the schematic illustration of the production equipment;
   the display system further comprising:
   an input unit,
   wherein the storage unit is further configured to store the causal relationship model data related to a second abnormality to occur in the production equipment, the second abnormality is different from the first abnormality,
   wherein the control unit is configured to receive a selection of one abnormality from the first abnormality or the second abnormality via the input unit, and
   wherein the control unit is configured to display the causal relationship model corresponding to a selected abnormality on the display unit, in response to the selection.

2. The display system according to claim 1,
   wherein the one or more driving means and the one or more monitoring means have one or more controllable feature quantities, and
   wherein the control unit displays cause elements of each abnormality and the one or more controllable feature quantities corresponding to the cause elements as a list on the display unit.

3. The display system according to claim 2,
   wherein the control unit is configured to execute the input unit to receive a selection of one of the cause elements from the list, and
   wherein the control unit is configured to highlight a selected cause element in the causal relationship model displayed on the display unit.

4. A display method for displaying, on a display unit, a causal relationship of abnormalities that can occur in production equipment, the production equipment producing a product and including one or more driving means comprising a motor configured to perform driving of the production equipment and one or more monitoring means comprising a sensor configured to perform monitoring production of the production equipment, the display method comprising:

storing schematic illustration data representing a schematic illustration of the production equipment;

storing causal relationship model data specifying at least two cause elements including a first cause element and a second cause element that can cause a first abnormality to occur in the production equipment, the at least two cause elements are selected from among at least one of the one or more driving means or the one or more monitoring means and represented as a causal relationship model together with a relationship between the at least two cause elements;

representing an operating state of a packaging machine by an operating state data; and displaying the schematic illustration and the causal relationship model based on the operating state on the display unit so that the causal relationship model is superimposed on the schematic illustration so as to correspond to the schematic illustration, wherein in the causal relationship model data, a first node represents the first cause element, a second node represents the second cause element, and an arrow is drawn from the first node pointing to the second node, the arrow represents the relationship between the at least two cause elements indicating the first cause element affects the second cause element, wherein the causal relationship model data including the first node, the second node, and the arrow are superimposed on the schematic illustration of the production equipment;

storing the causal relationship model data related to a second abnormality to occur in the production equipment, the second abnormality is different from the first abnormality, receiving a selection of one abnormality from the first abnormality or the second abnormality via an input unit, and displaying the causal relationship model corresponding to a selected abnormality on the display unit, in response to the selection.

5. A non-transitory computer-readable recording medium, recording a display program for displaying, on a display unit, a causal relationship of abnormalities that can occur in production equipment, the production equipment producing a product and including one or more driving means comprising a motor configured to perform driving of the production equipment and one or more monitoring means comprising a sensor configured to perform monitoring production of the production equipment, the display program causing a computer to execute:

storing schematic illustration data representing a schematic illustration of the production equipment;

storing causal relationship model data specifying at least two cause elements including a first cause element and a second cause element that can cause a first abnormality to occur in the production equipment, the at least two cause elements are selected from among at least one of the one or more driving means or the one or more monitoring means and represented as a causal relationship model together with a relationship between the at least two cause elements;

representing an operating state of a packaging machine by an operating state data; and displaying the schematic illustration and the causal relationship model based on the operating state on the display unit so that the causal relationship model is superimposed on the schematic illustration so as to correspond to the schematic illustration, wherein in the causal relationship model data, a first node represents the first cause element, a second node represents the second cause element, and an arrow is drawn from the first node pointing to the second node, the arrow represents the relationship between the at least two cause elements indicating the first cause element affects the second cause element, wherein the causal relationship model data including the first node, the second node, and the arrow are superimposed on the schematic illustration of the production equipment;

storing the causal relationship model data related to a second abnormality to occur in the production equipment, the second abnormality is different from the first abnormality, receiving a selection of one abnormality from the first abnormality or the second abnormality via an input unit, and displaying the causal relationship model corresponding to a selected abnormality on the display unit, in response to the selection.

* * * * *